United States Patent [19]
Honda

[11] Patent Number: 5,969,795
[45] Date of Patent: Oct. 19, 1999

[54] IMAGE READING APPARATUS

[75] Inventor: Takashi Honda, Toyokawa, Japan

[73] Assignee: Minolta Co., Ltd., Osaka, Japan

[21] Appl. No.: 09/012,470

[22] Filed: Jan. 22, 1998

[30] Foreign Application Priority Data

Jan. 22, 1997 [JP] Japan .................................. 9-009783

[51] Int. Cl.⁶ .................................................. G03B 27/32
[52] U.S. Cl. .......................... 355/25; 358/488; 358/474; 358/493
[58] Field of Search ................................. 355/23, 25, 77; 358/296, 474, 488, 493, 497; 399/362, 376

[56] References Cited

U.S. PATENT DOCUMENTS

| | | | |
|---|---|---|---|
| 5,084,611 | 1/1992 | Okisu et al. | 250/208 |
| 5,377,019 | 12/1994 | Okisu et al. | 358/464 |
| 5,416,609 | 5/1995 | Matsuda et al. | 358/474 |
| 5,463,697 | 10/1995 | Toda et al. | 382/199 |
| 5,479,262 | 12/1995 | Namiki et al. | 358/296 |
| 5,585,926 | 12/1996 | Fuji et al. | 358/471 |
| 5,610,720 | 3/1997 | Fijioka et al. | 358/296 |
| 5,764,383 | 6/1998 | Saund et al. | 355/25 |
| 5,805,272 | 9/1998 | Nozawa et al. | 355/25 |
| 5,835,241 | 11/1998 | Saund | 358/488 |

FOREIGN PATENT DOCUMENTS

| | | |
|---|---|---|
| 60-254869 | 12/1985 | Japan . |
| 62-014664 | 1/1987 | Japan . |
| 63-249869 | 10/1988 | Japan . |
| 1-218262 | 8/1989 | Japan . |
| 2-087769 | 3/1990 | Japan . |
| 3-079158 | 4/1991 | Japan . |
| 5-336341 | 12/1993 | Japan . |
| 6-046214 | 2/1994 | Japan . |
| 6-205194 | 7/1994 | Japan . |
| 6-326865 | 11/1994 | Japan . |
| 7-079324 | 3/1995 | Japan . |
| 7-234555 | 9/1995 | Japan . |
| 63-102472 | 5/1998 | Japan . |

*Primary Examiner*—D. Rutledge
*Attorney, Agent, or Firm*—Sidley & Austin

[57] ABSTRACT

A book scanner which reads an image of a book or a bound document placed as turned upward, computes the document inclination from the outer shape of the document, detects the top end of the bound part of the document from the document height, thereby determines the accurate position of the center line existing in a slanted posture, detecting the brightness in the neighborhood of the bound part, thereby computes the erasing width to be erased as unnecessary for an image with precision, and erases only the center line zone without failing to effect thorough erasure of the slanted center line.

8 Claims, 12 Drawing Sheets

ERASING WIDTH W1

IMAGE READING APPARATUS

BACKGROUND OF THE INVENTION

1. Field of the Invention

This invention relates to an image reading apparatus for placing a book or a bound document that is turned upward for reading an image of the leaf surface of the book or the bound document.

2. Description of the Related Art

In the conventional field of image reading apparatuses, the technique, which is composed of detecting a shaded zone generated by the protrusion of the central bound part in the leaf surface (the surface of spread pages of abound document) in terms of the shade depth of an image itself in the bound part and eliminating the detected zone during the reading of the bound document, has been proposed as disclosed in Japanese Laid-Open Patent Applications JP-A-62-14664, JP-A-63-249869, and JP-A-03-79158, for example. By this technique, it is avoided that the shade and shadow of the bound part, which does not need to be read out as an image, are generated in the center of the leaf surface and the image being read out of a bound document is obscured.

In the method of detecting the bound part and eliminating the detected zone as used in the conventional image reading apparatus, it is, however, incurred that particularly when the bound document is placed aslant, the shade and shadow of the bound part in the center of the leaf surface and the image information such as characters and ruled lines confusedly exist within data on the same main-scanning line (for example, in the longitudinal direction of the apparatus). Such a situation gives rise to the drawback that the bound part is not easily detected and the elimination of the center line zone is not properly attained.

SUMMARY OF THE INVENTION

An object of this invention is to provide an image reading apparatus which is capable of properly eliminating the center line zone in the leaf surface (the surface of spread pages) of a bound document, which does not need to be read out, even when the bound document is placed as inclined to a certain extent.

One aspect of this invention concerns an image reading apparatus for reading by optical scanning a bound document placed on a document platen as spread in a lateral direction, which comprises an image reading device which reads an image including the bound document on the document platen and outputs an image data; a boundary detector which detects a boundary between the document platen and the bound document based on the image data; an inclination detector which detects a document inclination relative to the document platen based on the boundary; a height distribution detector which detects a height distribution corresponding to changes in height of the bound document; a bound part detector which detects a bound part of the document at a position used for a detection of -he height distribution, based on the height distribution; and a center line computing unit which computes a center line defining a boundary between left and right pages of the bound document based on the document inclination and the detected bound part.

Another object of this invention concerns a method for erasing a center line defining a boundary between left and right pages of a bound document which is placed aslant on a document platen and spread to expose the left and right pages, which comprises a step of reading an image including the bound document on the document platen and outputting a first image data; a step of detecting a boundary between the document platen and the bound document based on the first image data; a step of detecting a document inclination relative to the document platen based on the boundary; a height distribution detecting step of detecting a height distribution indicating changes in height of the bound document; a step of detecting a bound part of the document at a position used for a detection of the height distribution, based on the height distribution; a step of computing the center line defining the boundary between the left and right pages based on the document inclination and the detected bound part; a step of reading an image including the bound document on the document platen and outputting a second image data; and a step of erasing the computed center line from the second image data.

The objects, features, and characteristics of this invention other than those set forth above will become apparent from the description given herein below with reference to preferred embodiments illustrated in the accompanying drawings.

DETAILED DESCRIPTION OF THE PREFERRED EMBODIMENT

A book scanner according to one embodiment of the image reading apparatus of this invention will be described below with reference to the accompanying drawings.

Overall Construction

Figure 1:
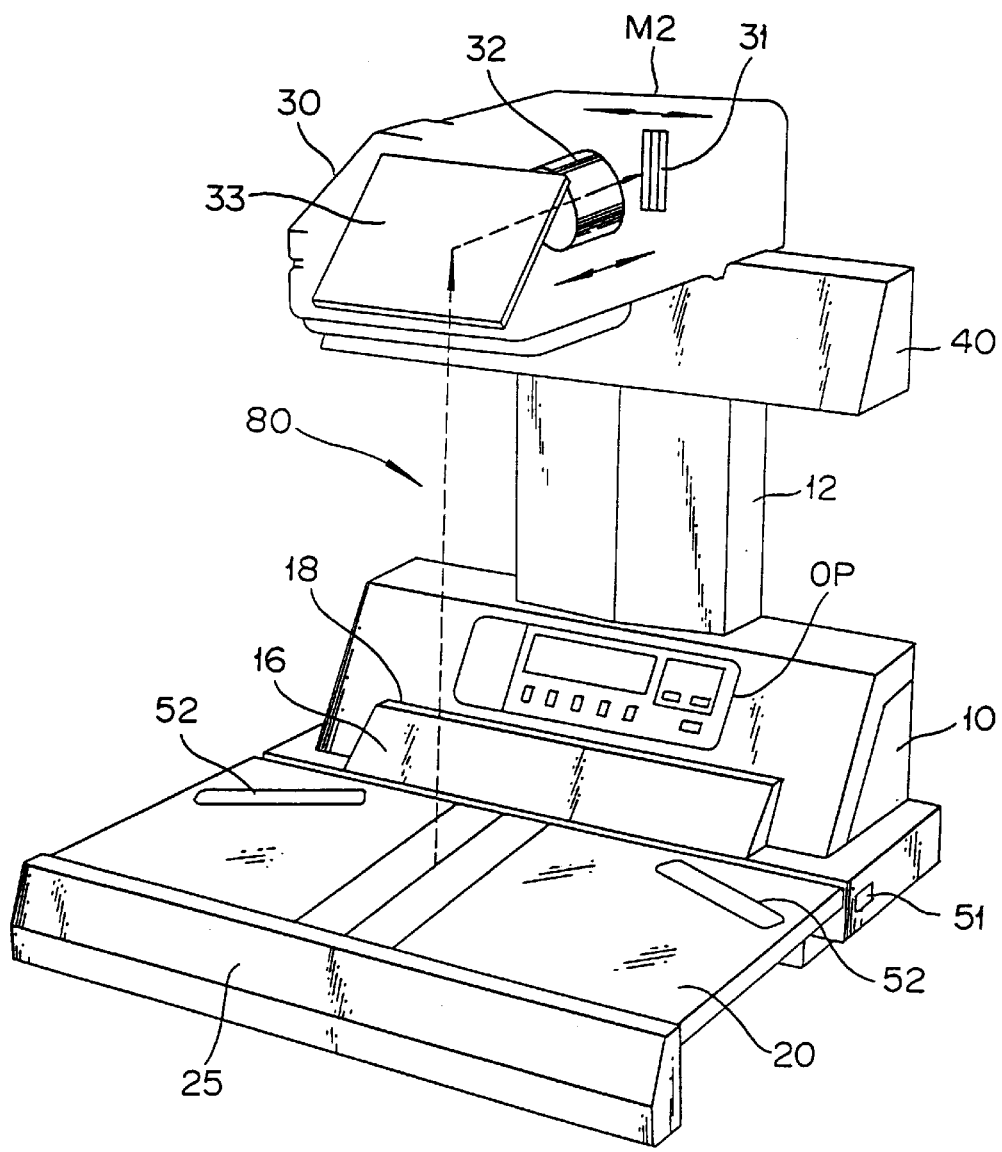
FIG. 1 is a perspective view illustrating the appearance of a book scanner according to one embodiment of the image reading apparatus of this invention.
Figure 2:
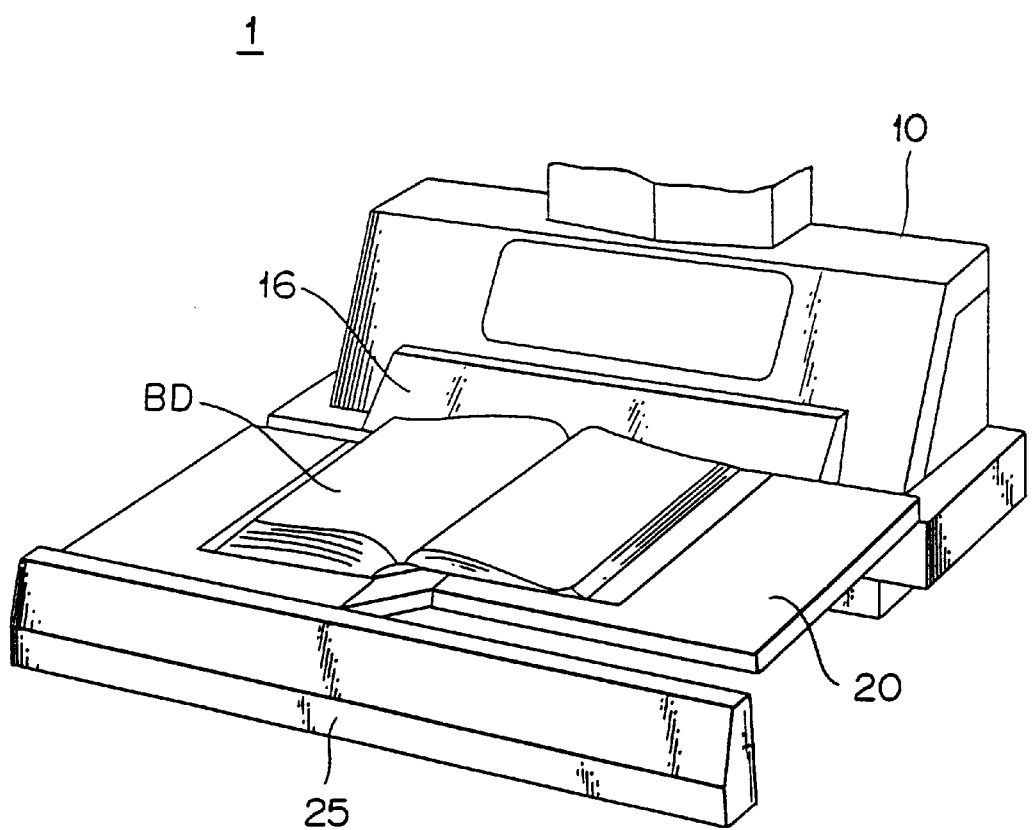
FIG. 2 is a diagram illustrating the state in which a bound document is set in position.

FIG. 1 is a perspective view illustrating the outer appearance of a book scanner 1 and FIG. 2 is a diagram illustrating the state in which a bound document BD is set in position.

The book scanner 1 is provided with a housing body 10 for containing electric circuits and others, a document platen 20 of a dark color for supporting a bound document, an image reading device 30 for converting a document image (a leaf image) into an electric signal, and a lamp unit 40 for illuminating the document. The document platen 20 is disposed on the front side of the housing body 10. The image reading device 30 is disposed above the document platen 20 and supported like a cantilever by a supporting column 12 extended upward from the upper surface of the housing body 10. The lamp unit 40 is disposed on the lower surface side of the image reading device 30 and fixed to the supporting column 12. A space 80 between the document platen 20 and the image reading device 30 is open into the free area outside the apparatus and amply wide for setting a bound document. The distance from the document platen 20 to the image reading device 30 is more than 30 cm.

The housing body 10 is provided with a control panel OP on the upper end of the front side. A distance measuring mirror 16 for detecting the height of leaf surface (the surface of the spread pages) is fixed to the lower end of the front side of the housing body 10. The front side of the distance measuring mirror 16 is a glossy flat surface inclined by 45° relative to the upper surface of the document platen 20. The upper end surface of the distance measuring mirror 16 functions as a white plate 18 for the correction of shading. A main switch 51 is disposed on the right lateral surface of the housing body 10 relative to the control panel OP.

Start keys 52 for the user to instruct the apparatus to start reading a document are provided one each on the opposite sides in the lateral direction of the document platen 20. An arm rest 25 is provided on the front side of the document platen 20.

The image reading device 30 is provided with a linear sensor 31 of a CCD array, a lens 32 for the image focusing, and a mirror 33. The document image is projected by the mirror 33 and the lens 32 on the light-receiving face of the linear sensor 31. The lens 32, which is movable in the longitudinal direction, is positioned by an AF mechanism that is not shown in the diagram.

The linear sensor 31, which is fitted on a moving element of a scanning mechanism which is not shown in the diagram, is moved along parallel to the lateral direction (sub-scanning direction) M2 with the array of the CCD elements kept in the vertical direction. By this parallel motion, the linear sensor 31 captures the two-dimensional document image. That is to say, in the book scanner 1, this motion of the linear sensor 31 forms a two-dimensional image reading plane. When an area sensor is used in the place of the linear sensor 31, the light-receiving face corresponds to the two-dimensional image reading plane. The main-scanning direction of the document image is the longitudinal (front and back) direction on the document platen 20 and the perpendicular (upper and lower) direction on the image reading plane.

The book scanner 1 constructed as described above constitutes itself an image reading apparatus which fits the purpose of reading a bound document. By combining the book scanner 1 with a digital copying machine, therefore, it is made possible to form a comprehensive copying system which fits various kinds of documents.

The user, in preparing the book scanner 1 for use, places a bound document BD as spread at a pertinent page and turned upward on the document platen 20 as illustrated in FIG. 2. The boundary between the distance measuring mirror 16 and the document platen 20 forms the base line for setting a given document. The center of the base line functions as the base position for positioning the document in the lateral direction. The document platen 20 is constructed so that the left and light half sections will be vertically moved independently of each other. This construction allows the left and right spread pages of the document to fall substantially flush with each other.

The book scanner 1 scans the document or reads the document image twice. The bound document BD, unlike the sheet document, has the curved leaf surface. It, therefore, requires adjusting the focus of the image reading in accordance with the state of the curve. It also requires carrying out processing for correcting a brightness difference. Thus, it utilizes the first scanning (hereinafter referred to as "preparatory scanning") for detecting the state of this curve and, based on the result of this detection, relies on the second scanning (hereinafter referred to as "actual scanning") to carry out necessary processing. The image output to an external device is executed during the actual scanning. The moving direction of the linear sensor 31 during the actual scanning is opposite to the direction during the preparatory scanning. The scanning mode is composed of two types, the mode of collectively scanning the left and right pages (the same mode as used in the sheet document) and the mode of scanning the left and right pages separately. In either of the modes, the preparatory scanning and the actual scanning are carried out on each page.

Operational Flow of Apparatus

Figure 3:
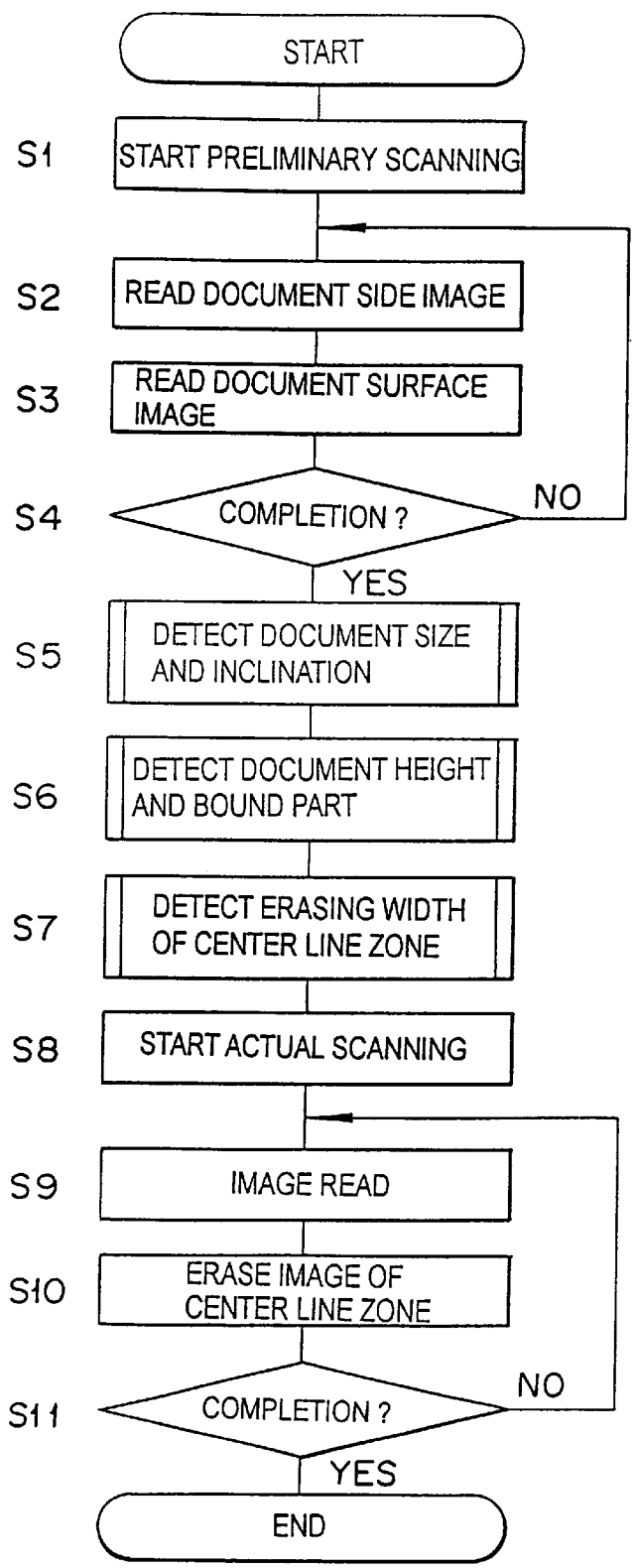
FIG. 3 is a diagram illustrating in outline the operational flow of the book scanner.

FIG. 3 is a diagram illustrating in outline the operational flow of the book scanner 1.

When the start button is pushed, the apparatus starts a preliminary scanning motion to detect the document size, the document height and the document brightness (S1). Then, the linear sensor 31 is laterally moved to read the lateral face image reflected on the inclined distance measuring mirror 16 and the leaf surface simultaneously (S2 and S3). When the preliminary scanning is completed (YES at S4), the document size and the document inclination are detected based on the brightness difference between the document and the document platen as to the image of the leaf surface (S5). Next, the document height is detected from the characteristics of the distribution of brightness obtained from the lateral face image of the document, and the bound part forming the inflection point of the leaf surface is detected from the lateral shape of the document (S6). Then, the center line position is computed based on the results at S5, S6 and the erasing width of the zone which is to be removed from the image as unnecessary, is detected from the difference in brightness near the bound part (S7).

After the position of the center line and the erasing width has been fixed, the present apparatus starts the actual scanning for reading out the document image (S8). Then, the linear sensor 31 is moved with reading the image of the leaf surface (S9). When a scanning area reaches the center line zone which is to be eliminated as defined by the center line position and the erasing width, the relevant image data is erased for each line and the document image is outputted (S10). When the actual scanning is terminated (YES at S11), the reading of the document image is completed.

The detection actions and the operations mentioned above will be described in detail below.

Detection of Document Size and Inclination

Figure 4:
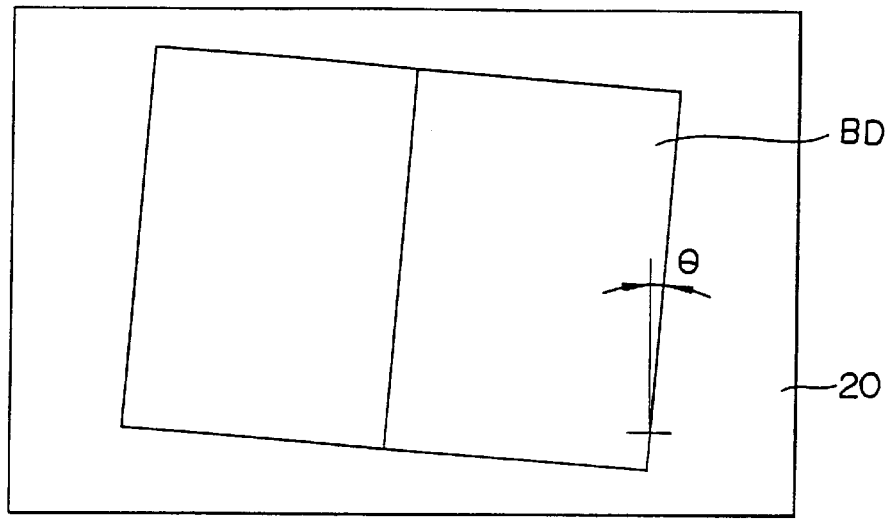
FIG. 4 is a plan view of the bound document placed on a document platen.

FIG. 4 is a plan view of a bound document BD set in position on the document platen 20.

During the preliminary scanning, the reading of the image on the leaf surface is effected by sampling the image at a rough pitch (1 mm, for example). As a result, by the time that the preliminary scanning is terminated, the data obtained by the sampling has been stored in a memory (RAM) which is built in the apparatus. The boundary line between the document platen 20 and the bound document BD can be detected by comparing the sampling data with the preset threshold in terms of the number of picture elements or detecting the amount of variation based on the differential between the adjacent picture elements.

The detection of the document inclination set in position on the document platen is attained by the following method. When a thick bound document is spread, turned upward and read out by the image reading apparatus, the edge (along the sub-scanning direction) of the upper end (on the inside) or the lower end (on the outside) of the document forms a bulging curve relative to the horizontal line (the lateral direction) of the document platen 20 (refer to FIG. 5). The detection of the document inclination based on the upper or lower edge of the document, therefore, requires a complicated step. The inclination is computed, therefore, from the right or left edge (along the main-scanning direction) which is not affected by the document height distribution. Specifically, the array of sampling data indicating the right or left edge is approximated by a linear equation. The angle of the line relative to the vertical line (the longitudinal direction) of the document platen 20 is defined as the document inclination θ.

Detection of Document Height and Bound Part

Figure 5:
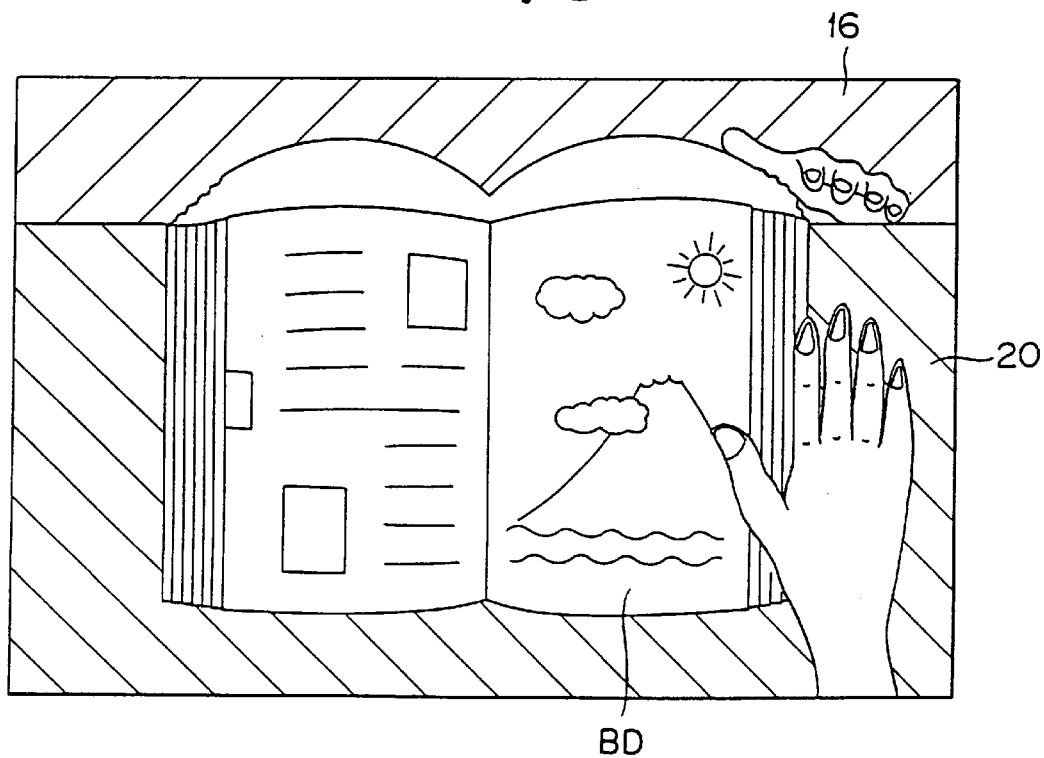
FIG. 5 is a schematic diagram illustrating the appearance of an image data during the reading of a document image.

FIG. 5 is a descriptive drawing illustrating the appearance of image data obtained during the reading of a document image. The image of the lateral face (the terminal surface on the inside) is read out such that the high part of the image is curved upward owing to the change in the document height. The images of the leaf surface and the lateral face of the document are read as data wholly on white side because they are illuminated by the lamp unit 40. In contrast, the images of the document platen 20, which is colored in higher density than the background of the document, and the background, in which the lateral face of the document is not reflected by the distance measuring mirror 16, are read as data close to black side because the amount of incident light is inevitably small. FIG. 5 includes an operator's hand for the purpose of facilitating the viewer's comprehension.

Figure 6:
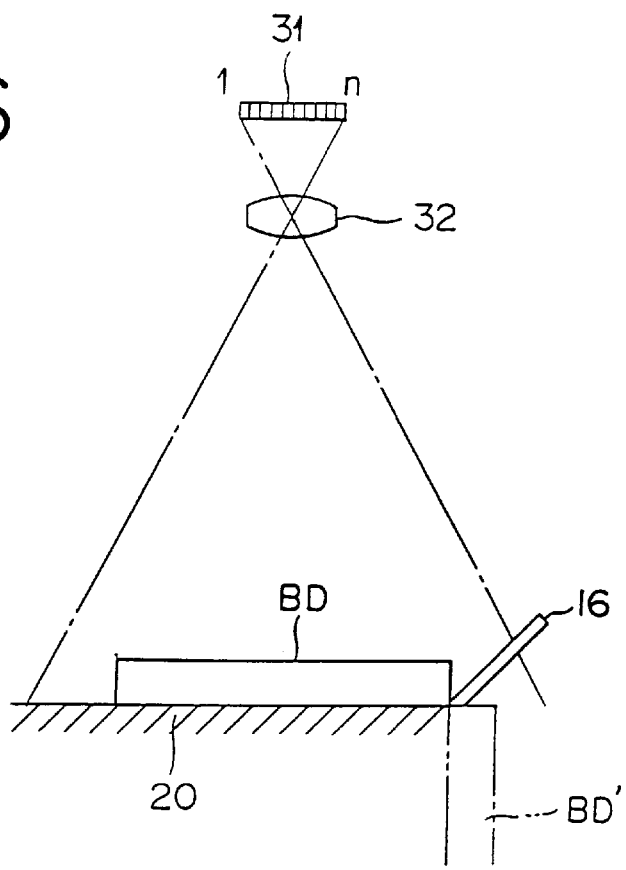
FIG. 6 is a conceptual diagram illustrating the principle of measuring the document height.

FIG. 6 is a conceptual diagram illustrating the principle of measuring the document height. When a document BD is set in position, the distance measuring mirror 16 forms a mirror image BD' of the document BD. The mirror image of the lateral face of the document is formed on the extension of the document platen 20 as illustrated in the diagram. In the diagram, the reading range of the linear sensor 31 is indicated with alternate long and short dash line and the number of picture elements in the main-scanning direction is indicated with 1–n.

Figure 7:
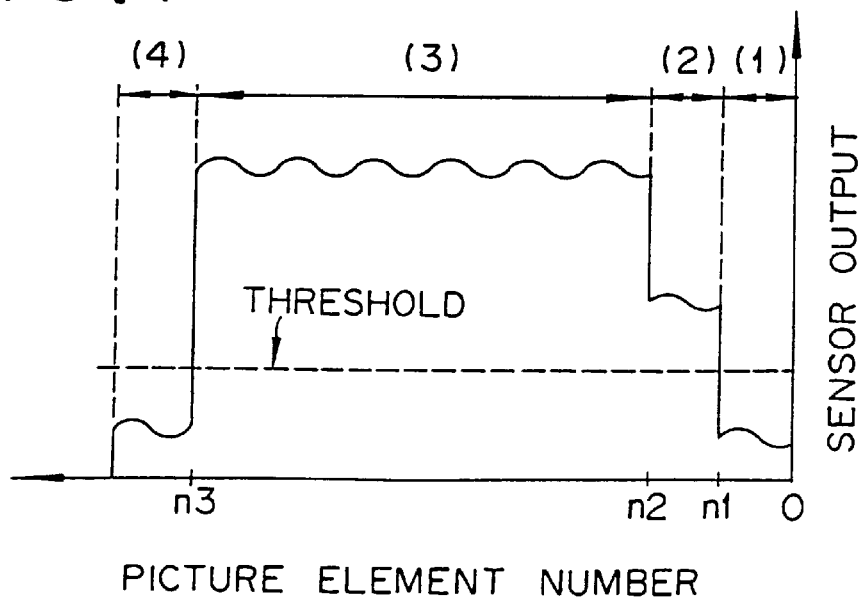
FIG. 7 is a graph showing one example of output of one line produced by a linear sensor in the main-scanning direction.
Figure 8:
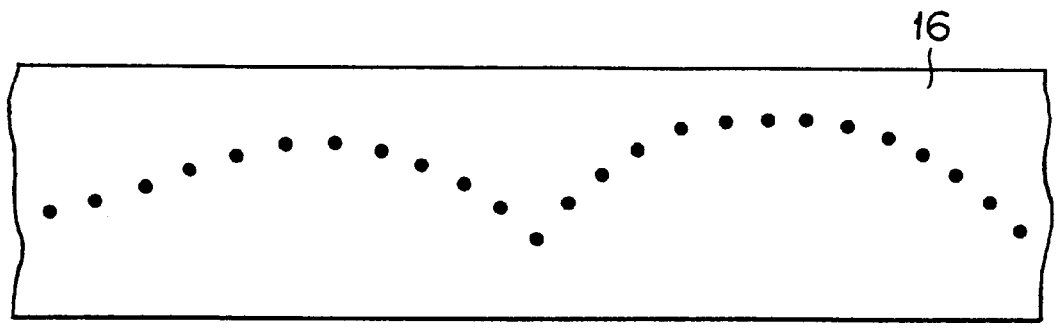
FIG. 8 is a graph showing the data of the document height distribution in the lateral direction.

FIG. 7 is a graph illustrating an example of the output of one line in the main-scanning direction obtained by the linear sensor 31. In the diagram, the horizontal axis is the scale of addresses of picture elements of the linear sensor 31 (left on the outside and right on the inside) and the vertical axis is the scale of the sensor output corresponding to the brightness on the sensor surface. From the right of the graph forward, (1) corresponds to the background area where the lateral face of the document is not reflected on the distance measuring mirror, (2) corresponds to the lateral face area where the lateral face of the document is reflected on the distance measuring mirror, (3) corresponds to the leaf surface area, and (4) corresponds to the document platen area surface. Incidentally, a threshold is set concerning the sensor output and the edge n1 of the lateral face of the document is detected from the smallest values of the picture elements that pass this threshold. The base position for setting the document is fixed at the picture element address n2. The distance is measured based on the difference from the base position. To be specific, the distance (n2–n1) represents the number of picture elements corresponding to the document height. The data of document height distribution in the lateral direction illustrated in the schematic drawing of FIG. 8 can be obtained by performing this step at a fixed interval in the sub-scanning direction of the linear sensor 31.

The inflection point (the bound part of the document) is detected by the following procedure using the data of document height distribution in the lateral direction obtained by the method described above.

First, the following are set forth as rules for the detecting the bound part:

(A) The bound part of a document generally exists close to the approximate center of the document; and (B) The document height in the bound part falls down in the shape of the letter V relative to the distribution of height in the immediate neighborhood.

Figure 9:
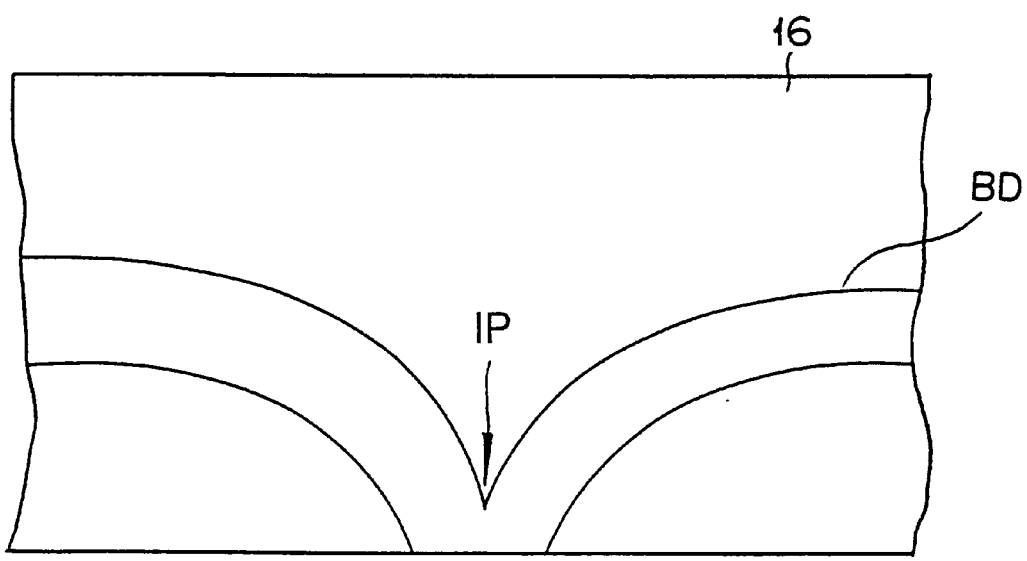
FIG. 9 is a schematic diagram illustrating a method for detecting a bound part.

The step of detecting the bound part is carried out in accordance with these rules. In regard to rule (A), the data range of the height distribution corresponding to the neighborhood of the center line of the document can be set based on the document size detected as described above. Then, in regard to rule (B), the position of the bound part can be detected by checking the sign of the differential of the adjacent data of height distribution and utilizing the fact that the inflection point, which occurs where the negatives or positives have continued over a desired number of points and then the reverse signs continue over a desired number of points, has a high possibility of constituting itself the position of the bound part, as illustrated in FIG. 9.

Figure 10:
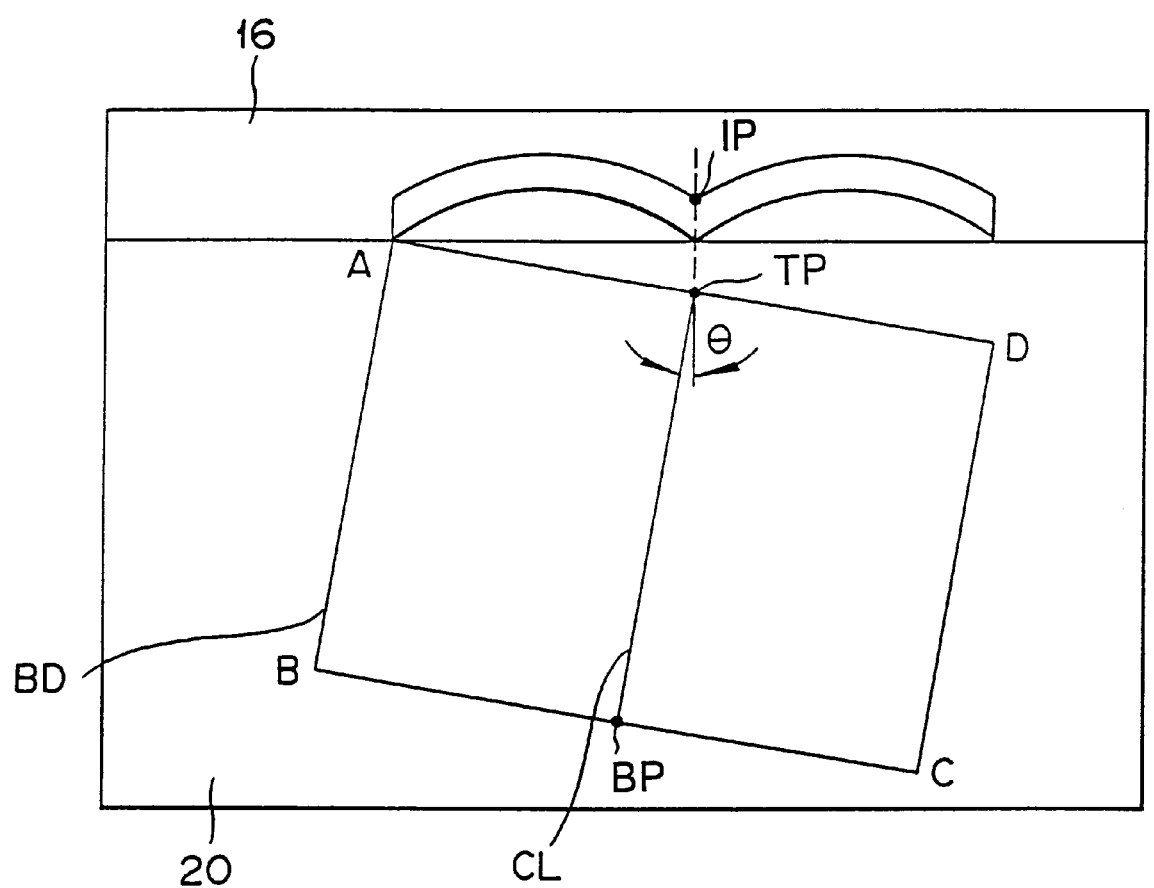
FIG. 10 is a schematic diagram illustrating a method for computing the center line position of the document.

FIG. 10 is a schematic diagram illustrating a method for computing the center line position of a document. The position of the inflection point IP in the sub-scanning direction which is reflected on the distance measuring mirror 16, is identified from the results of detection already obtained as described above, as illustrated in FIG. 10. Then, the coordinates of the top position TP of the center line CL on the document platen 20 can be obtained by searching the position of the boundary (the edge on the inside of the document) between the document platen 20 and the document BD at the same position in the sub-scanning direction as the inflection point IP with respect to the detected document size as described above. Further, the results of the detection of the document size allows determination of the terminal edge AB (or CD, namely either of the left and right terminal edges) extending substantially along the main-scanning direction of the document BD. Then, the coordinates of the bottom position BP of the center line CL can be computed from the results of the detection of the length and the document inclination θ. From these results, the straight line interconnecting the coordinates TP and BP can be found as the position at which the center line CL exists.

Detection of Erasing Width

Figure 11:
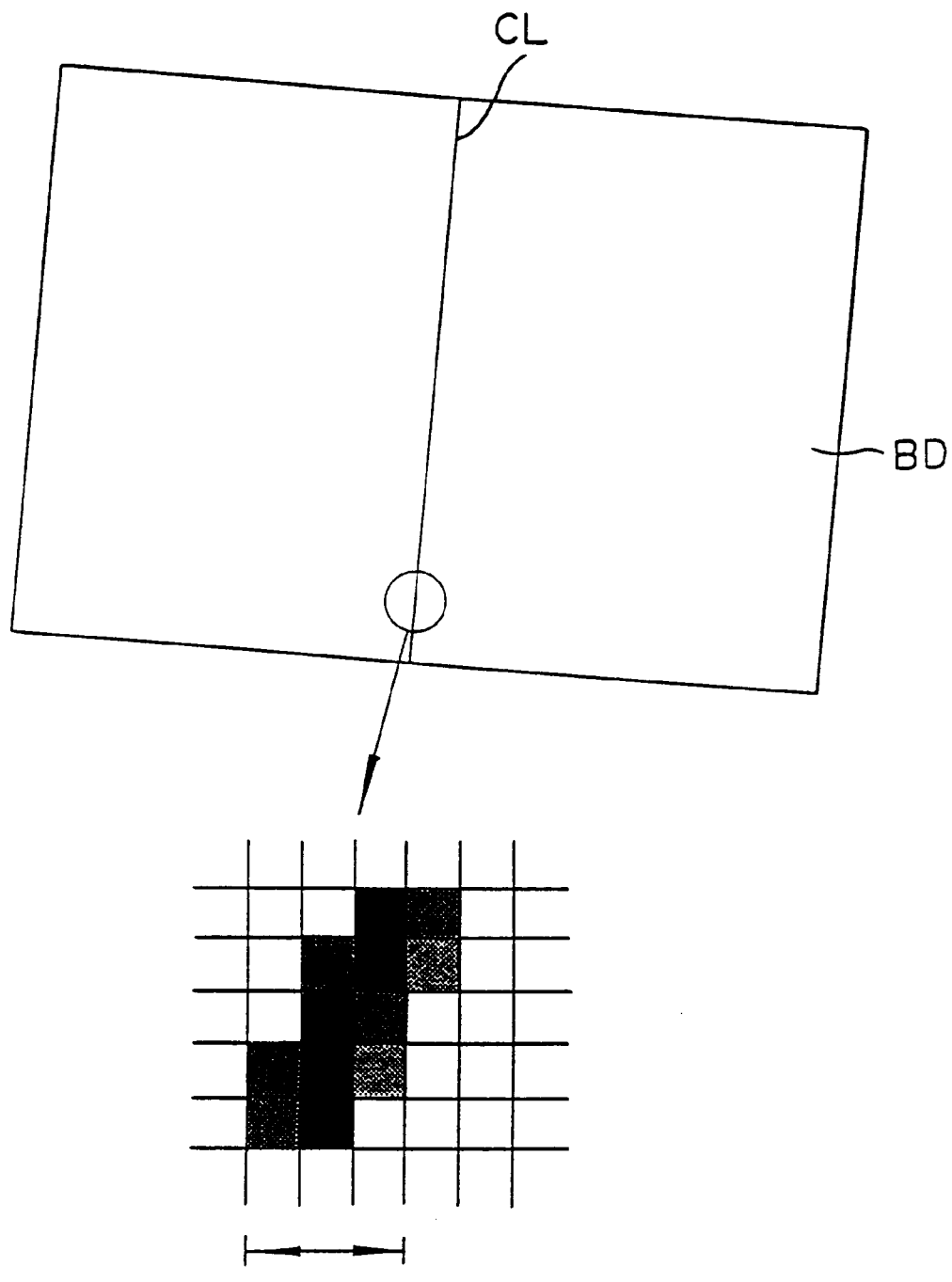
FIG. 11 is a schematic diagram illustrating a method for detecting the erasing width during the elimination of the center line zone of the document.

FIG. 11 is a schematic diagram illustrating a method for detecting the erasing width in the removal of the center line zone of the document. In the detection of this erasing width, the sampling data obtained during the preliminary scanning is examined in the terms of the brightness of the each data of picture elements corresponding to the center line position already detected. It is the shade and shadow occurring in the bound part that appears as the center line in the output image. It follows as a consequence that the picture elements of low brightness occurring in the neighborhood of the bound part constitute the zone of center line to be eliminated. In the case of sampling data as illustrated in FIG. 11, a desired number of data points falling on both sides of the center line CL are sequentially examined for the brightness. The widest of all the detected widths is adopted as the erasing width W1 representing the erasing zone in the lateral direction. That is to say, the zone of the erasing width W1 that is centered at the position of the center line CL, constitutes itself the center line zone 60 to be eliminated as unnecessary for the image (FIG. 12).

Figure 12:
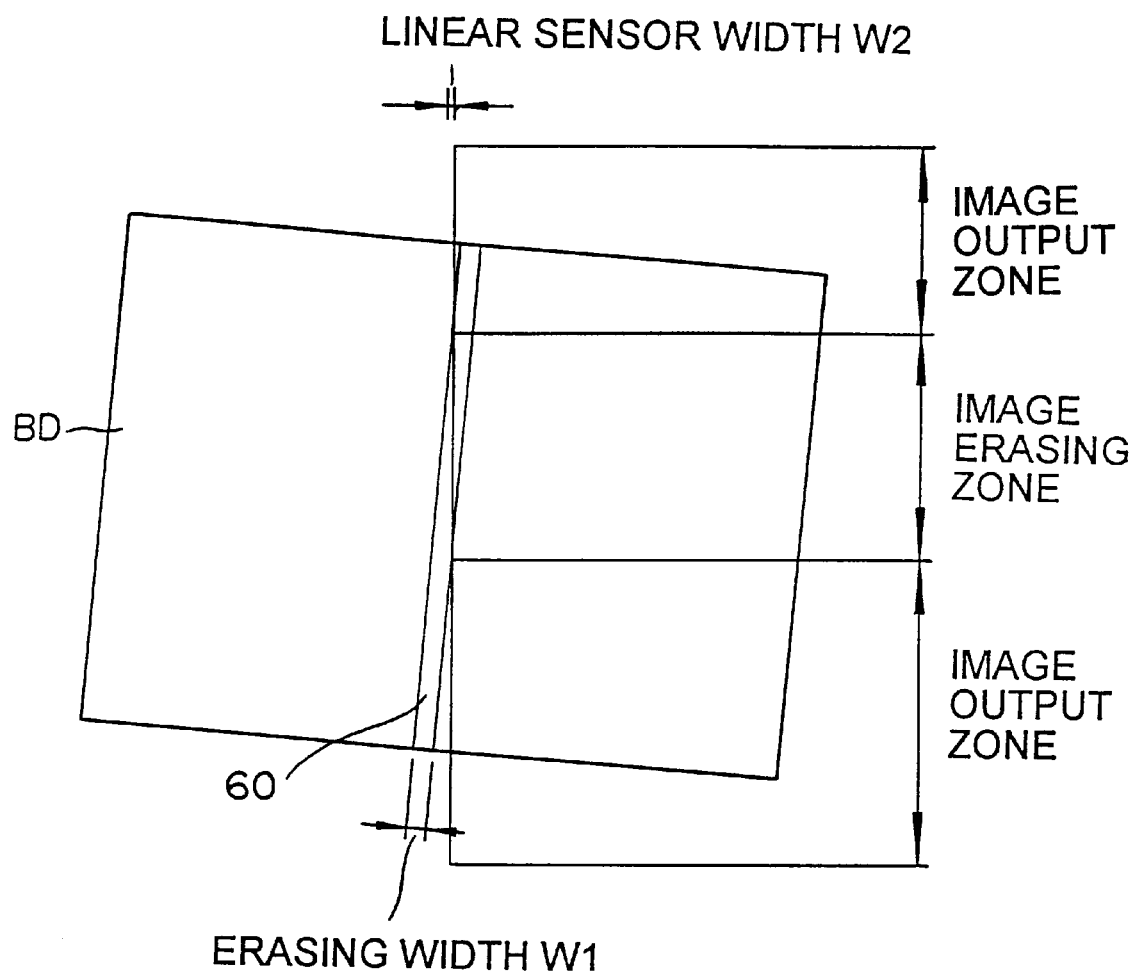
FIG. 12 is a schematic diagram illustrating the setting of the image output zone and the image erasing zone in one line passing the center line zone.

FIG. 12 is a schematic diagram illustrating the setting of an image output zone and an image erasing zone in one line passing the center line zone. In the main-scanning, when the scanning point by the linear sensor 31 passes the center line zone 60 as illustrated in FIG. 12, the image data, which exists within the center line zone 60, is set as falling in the zone of image to be eliminated.

Oblique Erasure of Image Data

For obliquely erasing the center line zone in the image data based on the information obtained as described above, the image processing control circuit constructed as follows is used, for example.

Figure 13:
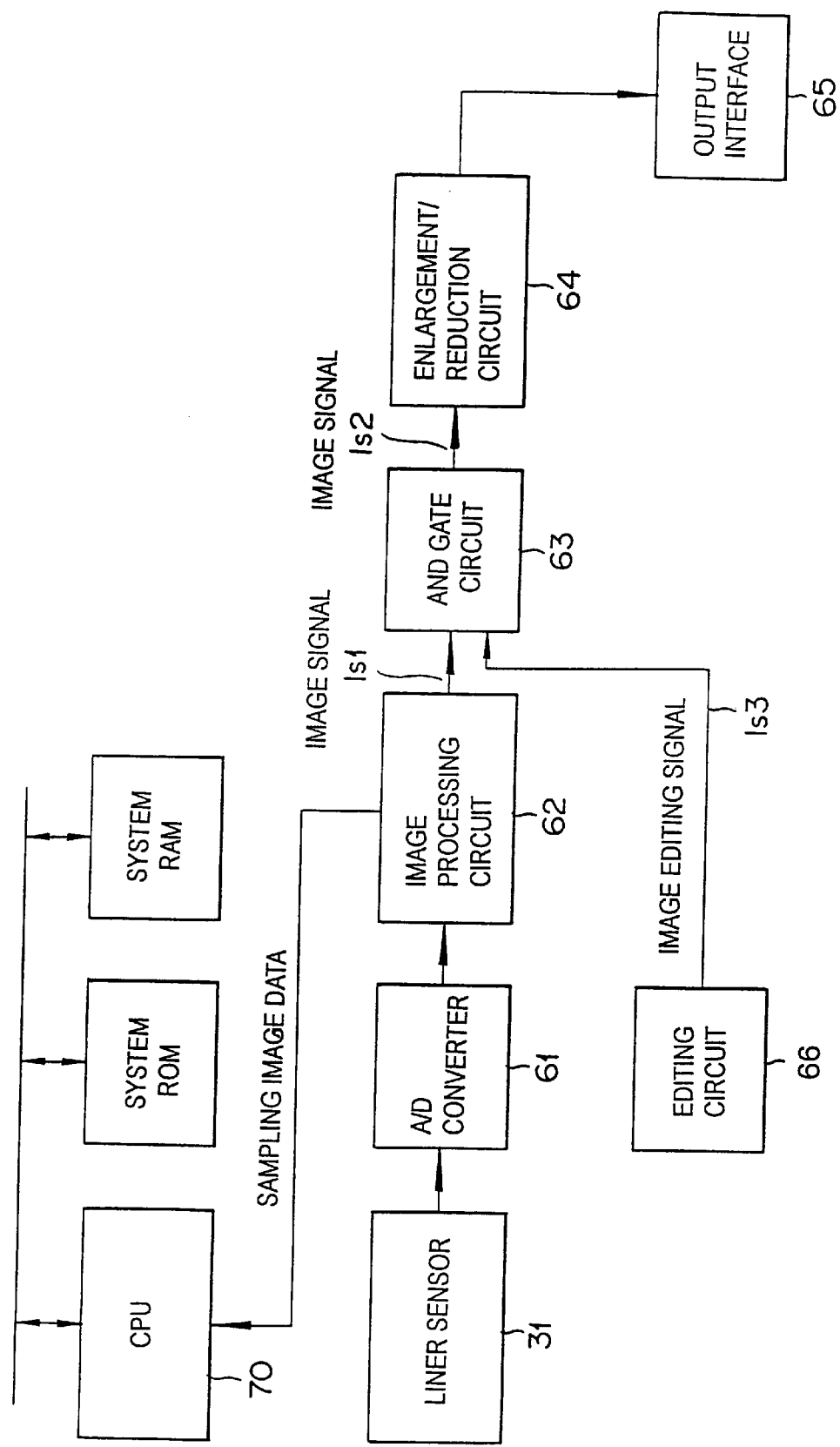
FIG. 13 is a block diagram of an image processing control circuit of the present embodiment.
Figure 14:
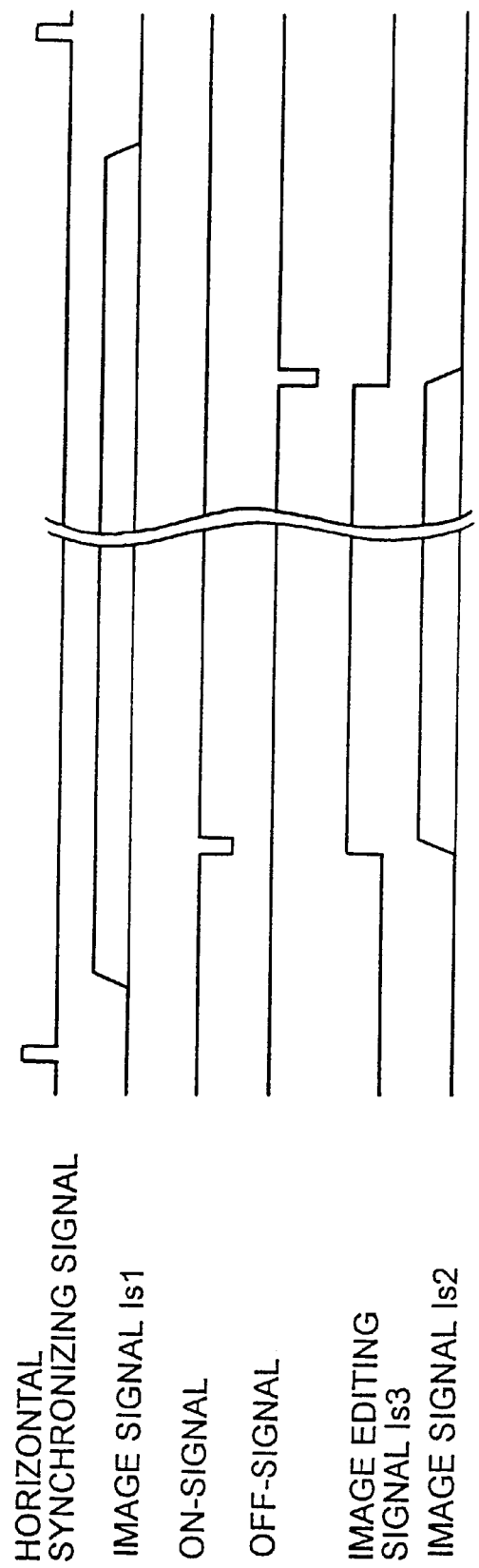
FIG. 14 is a timing chart of each signals in the image processing control circuit.

FIG. 13 is a block diagram of the image processing control circuit of the present embodiment and FIG. 14 is a timing chart depicting various signals generated in the image processing control circuit. Specifically, an analog signal read out of the linear sensor 31 is converted by an A/D converter 61 a digital data. The digital data undergoes such processings as shade conversion, edge emphasis and γ conversion in an image processing circuit 62 and then is outputted from the circuit 62 (the signal after the image processing is represented as image signal Is1). The output of the image signal Is1 is controlled in an AND gate circuit 63 by an image editing signal Is3 outputted from an editing circuit 66. Namely, the image signal Is1 is inputted to a next enlargement/reduction circuit 64 only while the image editing signal Is3 remains effective (the status of high level, for example). The image is "white" while the image editing signal Is3 remains invalid (the status of low level, for example) in reference to FIG. 14. The image data, which has been processed by the image editing signal Is3 (represented as image signal Is2), is enlarged or reduced in the enlargement/reduction circuit 64. Then, the image signal is transmitted to an output interface 65 and outputted outside.

Figure 15:
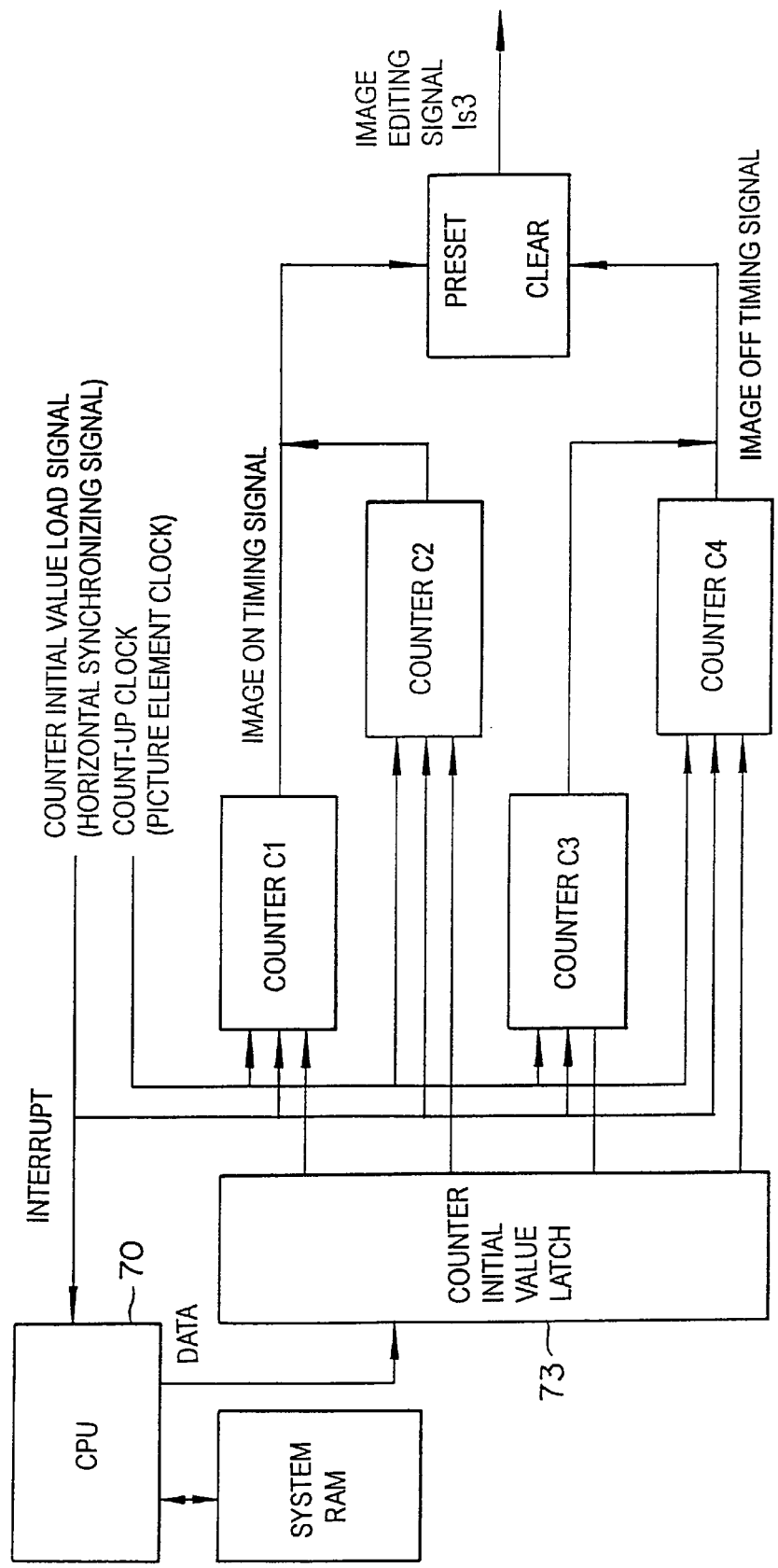
FIG. 15 is a block diagram of the editing circuit shown in FIG. 13.

FIG. 15 is a block diagram of the editing circuit 66 shown in FIG. 13. The image editing signal Is3 is composed of an image-on timing signal (hereinafter referred to briefly as ON-signal) generated by counters C1, C2 and an image-off timing signal (hereinafter referred to briefly as OFF-signal) generated by counters C3, C4. Initial values are respectively loaded into these counters by a latch 73 each time a horizontal synchronizing signal is generated and the count starts based on picture element clock. After the count has reached a desired value, the ON-signal remains at "low" for the duration of one picture element clock. When the ON-signal turns to "low," the image editing signal Is3 becomes active. Incidentally, when the OFF-signal turns to "low," the image editing signal Is3 becomes inactive (FIG. 14).

A CPU 70 handles the horizontal synchronizing signal as an interrupt. In the other words, after having detected the shift to the current line, the CPU 70 sets the next value for the next line at the latch 73 until the step shifts to the next line. As a result, initial values, which will be loaded into the counters C1, C2, C3 and C4 at the start of the next line, are reset and the ON/OFF timings of image output are changed. The image editing signal Is3, which is necessary for the oblique erasure of the center line zone, can be obtained by repeating the reset of the values of points of timing chance for each line (or for several lines) in the manner described above. The possibility of the center line zone falling in a straight line along the main-scanning direction is undeniable. The case is to be handled as one form of the oblique center line zone.

The present embodiment computes the timing for erasing the center line zone for each line in advance of the actual scanning and sets the count of the ON/OFF-signal for each line during the actual scanning. As a result, the center line zone can be accurately erased even when the detected center line extends obliquely relative to the main-scanning direction.

The image reading apparatus of this invention detects the document inclination and the upper end position of the bound part to accurately determine the position of the bound part existing in an oblique posture, and also identifies the brightness in the neighborhood of the bound part to precisely compute the width of an image for erasure as an unnecessary zone. It then effects exclusive erasure of the image in the zone of center line determined as described above. By this simple construction, the apparatus cannot either impair the characters or the image or fail to attain thorough erasure of the center line during the removal of the center line zone even when the document is inclined. That is to say, the center line zone can be very accurately and easily removed.

It is obvious that this invention is not limited to the particular embodiments shown and described above but may be variously changed and modified without departing from the technical concept of this invention.

The embodiment detects the document height by using the linear sensor 31 to read out the image of the document lateral face reflected on the distance measuring mirror 16. Alternatively, this invention can be applied to an apparatus which directly reads the lateral image with an exclusive sensor instead of using the mirror.

The entire disclosure of Japanese Patent Application No. 09-009783 filed on Jan. 22, 1997, including the specification, claims, drawings and summary are incorporated herein by reference in its entirety.

What is claimed is:

1. An image reading apparatus for reading a bound document placed on a document platen spread in a lateral direction, the apparatus comprising:

an image reading device for reading an image including the bound document on the document platen and for outputting image data;

a boundary detector for detecting a boundary between the document platen and the bound document based on the read image data;

an inclination detector for detecting a document inclination based on the detected boundary, said inclination being a rotation of said document in the plane of the document platen;

a height distribution detector for detecting a height distribution of the bound document, said height distribution being detected at a longitudinal position;

a bound part detector for detecting a bound part of the document at said longitudinal position used for detecting the height distribution, said bound part detector detecting said bound part of the document based on the detected height distribution; and a center line computing unit for computing a center line defining a boundary between left and right pages of the bound document, said center line computing unit computing said center line based on the document inclination and the detected bound part.

2. An apparatus in accordance with claim 1, further comprising a center line erasing unit for erasing a portion of the image data corresponding to the computed center line.

3. An apparatus in accordance with claim 2, further comprising an erasing width decision unit for determining a width of an image near the center line, including said portion of the image data corresponding to the center line to be removed by said center line erasing unit, based on a brightness near the center line.

4. An apparatus in accordance with claim 1, wherein said image reading device reads the image from above the bound document which is placed on the document platen as spread upward.

5. A method for erasing a center line which defines a boundary between left and right pages of a bound document which is placed aslant on a document platen and spread laterally to expose the left and right pages, the method comprising the steps of:

a first image reading step of reading an image including the bound document on the document platen and outputting a first image data;

a boundary detecting step of detecting a boundary between the document platen and the bound document based on the first image data;

an inclination detecting step of detecting a document inclination based on the boundary, said document inclination being a rotation of said document in the plane of the document platen;

a height distribution detecting step of detecting a height distribution of the bound document, said height distribution being detected at a longitudinal position;

a bound part detecting step of detecting a bound part of the document at said longitudinal position used for detecting the height distribution, said bound part detecting step being performed based on the detected height distribution;

a center line computing step of computing the center line defining the boundary between the left and right pages based on the document inclination and the detected bound part;

a second image reading step of reading an image including the bound document on the document platen and outputting a second image data; and a center line erasing step of erasing a portion of the second image data corresponding to the computed center line.

6. A method in accordance with claim 5, further comprising an erasing width decision step of determining a width of an image near the center line, including said portion of the second image data corresponding to the center line to be removed at said center line erasing step, based on a brightness near the center line.

7. A method in accordance with claim 5, wherein said first image data has a density of picture elements that is lower than a density of picture elements of said second image data.

8. A method in accordance with claim 5, further comprising the step of outputting said second image data having said portion of the second image data corresponding to the computed center line erased therefrom.

* * * * *